(12) United States Patent
Katoh et al.

(10) Patent No.: US 7,694,512 B2
(45) Date of Patent: Apr. 13, 2010

(54) EXHAUST GAS PURIFICATION APPARATUS FOR INTERNAL COMBUSTION ENGINE

(75) Inventors: Kenji Katoh, Suntou-gun (JP); Shigemasa Hirooka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 394 days.

(21) Appl. No.: 11/662,973

(22) PCT Filed: Mar. 3, 2006

(86) PCT No.: PCT/JP2006/304678
§ 371 (c)(1),
(2), (4) Date: Mar. 16, 2007

(87) PCT Pub. No.: WO2006/093357
PCT Pub. Date: Sep. 8, 2006

(65) Prior Publication Data
US 2008/0028745 A1 Feb. 7, 2008

(30) Foreign Application Priority Data
Mar. 4, 2005 (JP) ............................. 2005-060869

(51) Int. Cl.
*F01N 3/18* (2006.01)
(52) U.S. Cl. .............................. 60/295; 60/285; 60/286
(58) Field of Classification Search .................... 60/286, 60/295, 301, 303, 285
See application file for complete search history.

(56) References Cited

U.S. PATENT DOCUMENTS

| | | | |
|---|---|---|---|
| 5,473,887 A | | 12/1995 | Takeshima et al. |
| 6,729,126 B2 * | | 5/2004 | Ogiso et al. .................... 60/285 |
| 2002/0012623 A1 * | | 1/2002 | Gobel et al. ............. 423/239.1 |
| 2004/0025499 A1 | | 2/2004 | Nakatani et al. |
| 2004/0040291 A1 * | | 3/2004 | Toshioka et al. .............. 60/295 |
| 2004/0123585 A1 * | | 7/2004 | Yamaguchi et al. ........... 60/274 |
| 2004/0216451 A1 | | 11/2004 | LaBarge et al. |

(Continued)

FOREIGN PATENT DOCUMENTS

CN 1206070 A 1/1999

(Continued)

*Primary Examiner*—Thomas E Denion
*Assistant Examiner*—Jonathan Matthias
(74) *Attorney, Agent, or Firm*—Oliff & Berridge, PLC

(57) ABSTRACT

A $NO_x$ occlusion and reduction catalyst 7 is arranged in an exhaust path 2 of an engine 1 to purify $NO_x$ in the exhaust gas. An electronic control unit (ECU) 30 of the engine operates the engine in an operating mode in which the exhaust gas increases in temperature with the air-fuel ratio thereof kept rich each time a predetermined amount of $SO_x$ is occluded in the catalyst 7, and executes the $SO_x$ poisoning restoration process for releasing $SO_x$ from the catalyst 7. The ECU controls the engine air-fuel ratio in such a manner that the $H_2$ concentration in the exhaust gas detected by the $H_2$ sensor arranged in the exhaust path upstream of the catalyst 7 is in a predetermined range. As a result, an appropriate amount of hydrogen is supplied to the catalyst 7 during the $SO_x$ poisoning restoration process. Thus, an appropriate amount of hydrogen is supplied to the catalyst 7 during the $SO_x$ poisoning restoration process, so that the $H_2S$ generation is suppressed while at the same time executing the $SO_x$ poisoning restoration process efficiently.

10 Claims, 8 Drawing Sheets

U.S. PATENT DOCUMENTS

2005/0000210 A1   1/2005   Smaling et al.

FOREIGN PATENT DOCUMENTS

| EP | 1 445 017 A1 | 8/2004 |
| JP | A 6-058138 | 3/1994 |
| JP | A 6-066129 | 3/1994 |
| JP | A-2000-161107 | 6/2000 |
| JP | A-2001-234737 | 8/2001 |
| JP | A 2002-047919 | 2/2002 |
| JP | A 2003-120383 | 4/2003 |
| JP | A-2004-68623 | 3/2004 |

* cited by examiner

EXHAUST GAS PURIFICATION APPARATUS FOR INTERNAL COMBUSTION ENGINE

TECHNICAL FIELD

The present invention relates to an exhaust gas purification apparatus for an internal combustion engine and, in particular, to an exhaust gas purification apparatus for an internal combustion engine using a $NO_X$ occlusion and reduction catalyst.

BACKGROUND ART

In a known exhaust gas purification apparatus for the internal combustion engine using a $NO_X$ occlusion and reduction catalyst, the $NO_X$ component in the exhaust gas is occluded (the word "occlusion" is used herein as a concept including both "absorption" and "adsorption") when the air-fuel ratio of the exhaust gas flowing into the catalyst is lean, and the occluded $NO_X$ is reduced and purified using the reduction component in the exhaust gas when the air-fuel ratio of the exhaust gas flowing into the catalyst becomes a stoichiometric or rich air-fuel ratio.

In the presence of $SO_X$ (sulfur oxide) in the exhaust gas, the $NO_X$ occlusion and reduction catalyst is known to occlude $SO_X$ in exactly the same manner as $NO_X$ in the case where the air-fuel ratio of the exhaust gas is lean.

The $SO_X$ has a high affinity with the occluded $NO_X$ component and generates a very stable compound. Once $SO_X$ is occluded in the $NO_X$ occlusion and reduction catalyst, therefore, the occluded $SO_X$ is not substantially released from the $NO_X$ occlusion and reduction catalyst simply by setting the air-fuel ratio of the exhaust gas to a rich air-fuel ratio and, thus, $SO_X$ is accumulated gradually in the catalyst.

In other words, in the normal process for occlusion and purification by reduction of $NO_X$, the $SO_X$ occluded in the $NO_X$ occlusion and reduction catalyst is substantially not released. With an increase in the amount of $SO_X$ occluded, therefore, the $NO_X$ occlusion capacity (the maximum $NO_X$ amount that can be occluded by the $NO_X$ occlusion and reduction catalyst) of the $NO_X$ occlusion and reduction catalyst decreases in accordance with the $SO_X$ amount occluded. With the increase in the amount of $SO_X$ occluded by the $NO_X$ occlusion and reduction catalyst, therefore, the $NO_X$ occlusion and reduction catalyst can no longer sufficiently occlude the $NO_X$ contained in the exhaust gas, and a so-called sulfur poisoning phenomenon ($SO_X$ poisoning) occurs in which the $NO_X$ purification rate is remarkably reduced.

In order to prevent the $SO_X$ poisoning of the $NO_X$ occlusion and reduction catalyst, a poisoning restoration process is required in which the occluded $SO_X$ is released from the $NO_X$ occlusion and reduction catalyst and the amount of the occluded $SO_X$ is reduced.

As described above, however, $SO_X$ occluded in the $NO_X$ occlusion and reduction catalyst forms a compound far more stable than $NO_X$ and cannot, substantially, be released from the $NO_X$ occlusion and reduction catalyst and, therefore, $SO_X$ cannot be sufficiently released from the $NO_X$ occlusion and reduction catalyst simply by setting the air-fuel ratio of the exhaust gas flowing into the $NO_X$ occlusion and reduction catalyst to a rich air-fuel ratio.

Normally, therefore, the poisoning restoration process is executed in such a manner that the exhaust gas is set to a rich air-fuel ratio while at the same time maintaining the $NO_X$ occlusion and reduction catalyst in a high-temperature range.

As described above, however, $SO_X$ is difficult to release from the $NO_X$ occlusion and reduction catalyst, and cannot be released sufficiently from the $NO_X$ occlusion and reduction catalyst within a short time even by the poisoning restoration process for holding the $NO_X$ occlusion and reduction catalyst in a high-temperature environment with a rich air-fuel ratio. A protracted execution of the poisoning restoration process, on the other hand, poses the problem that the increased length of time during which the catalyst is exposed to the high temperature is liable to cause thermal deterioration of the catalyst.

On the other hand, it is known that, in the case where hydrogen is contained in the exhaust gas flowing into the $NO_X$ occlusion and reduction catalyst during the poisoning restoration process, the rate at which $SO_X$ is released from the $NO_X$ occlusion and reduction catalyst increases and the poisoning restoration process can be efficiently completed within a comparatively short time.

Normally, the method of supplying hydrogen to the exhaust gas, in addition to the method of supplying hydrogen stored in an external container to the exhaust gas, includes a method in which hydrogen is generated from HC, CO or $H_2O$ contained in the exhaust gas by the water-gas-shift reaction.

In the case where the air-fuel ratio of the exhaust gas of the engine becomes rich, for example, the water-gas-shift reaction ($CO+H_2O \rightarrow CO_2+H_2$) or steam reforming ($HC+H_2O \rightarrow CO_2+H_2$) occurs and hydrogen is generated from HC, CO or $H_2O$ generated at the time of combustion. These reactions are further promoted by a three-way catalyst or the like. In the ordinary internal combustion engine having a three-way catalyst as a start catalyst in the exhaust path upstream of the $NO_X$ occlusion and reduction catalyst, for example, a comparatively large amount of hydrogen is generated in the exhaust gas once the exhaust gas air-fuel ratio becomes rich at the time of the poisoning restoration process or the reduction of $NO_X$ occluded in the $NO_X$ occlusion and reduction catalyst.

Apart from the three-way catalyst, it is possible to generate hydrogen at the time of engine operation with a rich air-fuel ratio by a hydrogen generating catalyst arranged in the exhaust path to cause the water-gas-shift reaction, or steam reforming, efficiently.

In Japanese Unexamined Patent Publication (Kokai) No. 2002-47919 ('919 publication), for example, although the $SO_X$ poisoning restoration process is not described, the degeneration of the $NO_X$ occlusion and reduction catalyst is determined using the hydrogen component generated in the exhaust gas at the time of purification by reduction of the $NO_X$ occluded in the $NO_X$ occlusion and reduction catalyst.

At the time of purification by reduction of the $NO_X$ occluded in the $NO_X$ occlusion and reduction catalyst, hydrogen in the exhaust gas is consumed for reducing $NO_X$ and therefore no hydrogen flows out downstream of the $NO_X$ occlusion and reduction catalyst as long as $NO_X$ remains occluded in the catalyst.

When hydrogen begins to flow out into the exhaust gas downstream of the $NO_X$ occlusion and reduction catalyst, therefore, the whole amount of the $NO_X$ occluded in the $NO_X$ occlusion and reduction catalyst is considered to have been purified by reduction. Therefore, the time from the start of purification by reduction of the occluded $NO_X$ to the detection of the hydrogen component on the downstream side corresponds to the amount of $NO_X$ occluded by the $NO_X$ occlusion and reduction catalyst.

According to the '919 publication, a $H_2$ sensor for detecting hydrogen in the exhaust gas is arranged in the exhaust paths upstream and downstream of the $NO_X$ occlusion and reduction catalyst and, based on the time required from the detection of hydrogen by the upstream-side $H_2$ sensor to the detection of hydrogen by the downstream-side $H_2$ sensor during the process of purification by reduction of the occluded $NO_X$, it is determined whether the amount of $NO_X$ occluded by the $NO_X$ occlusion and reduction catalyst has decreased or not (whether the $NO_X$ occlusion and reduction catalyst is degenerated or not).

As described above, the poisoning restoration process can be efficiently executed by supplying hydrogen into the exhaust gas flowing into the $NO_X$ occlusion and reduction catalyst during the execution of the $SO_X$ poisoning restoration process.

For this purpose, however, a sufficient amount of hydrogen to release the whole amount of $SO_X$ occluded in the $NO_X$ occlusion and reduction catalyst from the catalyst is required to be supplied to the $NO_X$ occlusion and reduction catalyst during the execution of the poisoning restoration process. Also, in order to supply a sufficient amount of hydrogen to the $NO_X$ occlusion and reduction catalyst, a lengthy $SO_X$ poisoning restoration process is required in the case where the concentration of the hydrogen component in the exhaust gas is low.

Further, in the case where the concentration of the hydrogen component in the exhaust gas supplied to the $NO_X$ occlusion and reduction catalyst exceeds a predetermined value during the poisoning restoration process, the problem is posed that the extraneous $SO_X$ reacts with hydrogen and $H_2S$ (hydrogen sulfide) is generated. Hydrogen sulfide not only has a unique odor but also is toxic, and therefore it is not desirable that hydrogen sulfide is generated each time the poisoning restoration process is executed.

For this reason, the concentration of the hydrogen component in the exhaust gas supplied to the $NO_X$ occlusion reproduction catalyst during the $SO_X$ poisoning restoration process and the duration of the poisoning restoration process are required to be set in such a manner that a sufficient amount of hydrogen can be supplied to the $NO_X$ to release and reduce the $SO_X$ occluded by the $NO_X$ occlusion and reduction catalyst on the one hand, and the concentration of the hydrogen component in the exhaust gas is required to be lower than the value for generating hydrogen sulfide on the other hand. In other words, the concentration of the hydrogen component in the exhaust gas during the $SO_X$ poisoning restoration process and the duration of the restoration process are required to be controlled in an appropriate range taking the aforementioned facts into consideration.

However, none of the prior arts considers the requirement of controlling the concentration of the hydrogen component in the exhaust gas during the $SO_X$ poisoning restoration process and the duration of the restoration process as related to the concentration of the hydrogen component. Although the '919 publication refers to the detection of the hydrogen component in the exhaust gas using the $H_2$ sensor, it totally fails to consider the efficient execution of the restoration process using hydrogen during the $SO_X$ poisoning restoration process or the operation of detecting the concentration of the hydrogen component and controlling the concentration of the hydrogen component itself or the duration of the restoration process.

As a result, in the prior art, there is a problem that the $SO_X$ poisoning restoration process of the $NO_X$ occlusion and reduction catalyst cannot be efficiently executed.

DISCLOSURE OF THE INVENTION

This invention has been developed in view of the problems described above, and the object thereof is to provide an exhaust gas purification apparatus for an internal combustion engine in which the $SO_X$ poisoning restoration process for the $NO_X$ occlusion and reduction catalyst can be efficiently carried out using hydrogen.

To achieve the above object, according to the present invention, there is provided an exhaust gas purification apparatus for an internal combustion engine, comprising a $NO_X$ occlusion and reduction catalyst arranged in the exhaust path of the internal combustion engine for absorbing and/or adsorbing or thereby occluding $NO_X$ in the exhaust gas when the air-fuel ratio of the exhaust gas flowing into the catalyst is lean and purifying by reducing the occluded $NO_X$ using the reduction component in the exhaust gas when the air-fuel ratio of the exhaust gas flowing into the catalyst is a stoichiometric air-fuel ratio or a rich air-fuel ratio; and a $H_2$ sensor arranged in the exhaust path upstream of the $NO_X$ occlusion and reduction catalyst for detecting the concentration of the hydrogen component in the exhaust gas; wherein the $SO_X$ poisoning restoration process, in which the air-fuel ratio of the exhaust gas flowing into the $NO_X$ occlusion and reduction catalyst is set to a rich air-fuel ratio while at the same time increasing the temperature of the exhaust gas to release the sulfur oxide occluded together with $NO_X$ by the $NO_X$ occlusion and reduction catalyst from the $NO_X$ occlusion and reduction catalyst, is executed in such a manner that at least one of the air-fuel ratio of the exhaust gas flowing into the $NO_X$ occlusion and reduction catalyst during the execution of the $SO_X$ poisoning restoration process and the duration of the $SO_X$ poisoning restoration process is controlled during the execution of the $SO_X$ poisoning restoration process based on the hydrogen component concentration in the exhaust gas upstream of the $NO_X$ reduction catalyst detected by the $H_2$ sensor.

Namely, according to the present invention, the concentration of the hydrogen component in the exhaust gas flowing into the $NO_X$ occlusion and reduction catalyst is detected by the $H_2$ sensor, and in accordance with the detected concentration of the hydrogen component, at least one of the exhaust air-fuel ratio and the duration of the $SO_X$ poisoning restoration process is controlled.

The concentration of the hydrogen component in the engine exhaust gas changes in accordance with the exhaust air-fuel ratio, and in the range of the rich air-fuel ratio, the lower (richer) the exhaust air-fuel ratio, the higher the concentration of the hydrogen component. By changing the exhaust air-fuel ratio in accordance with the concentration of the hydrogen component in the exhaust gas, therefore, the concentration of the hydrogen component in the exhaust gas flowing into the $NO_X$ occlusion and reduction catalyst can be adjusted in an appropriate range in which the $SO_X$ poisoning restoration process can be accomplished within a comparatively short time without generating hydrogen sulfide.

Also, by detecting the concentration of the hydrogen component (i.e. the concentration of the hydrogen component in the exhaust gas actually flowing into the $NO_X$ occlusion and reduction catalyst) with the $H_2$ sensor and changing the duration of the poisoning restoration process in accordance with the detected concentration of the hydrogen component, a sufficient amount of hydrogen, to release and reduce the whole amount of $SO_X$ occluded in the $NO_X$ occlusion and reduction catalyst, can be supplied to the $NO_X$ occlusion and reduction catalyst.

According to another aspect of the invention, there is provided an exhaust gas purification apparatus for the internal combustion engine, further comprising a $SO_X$ trap arranged in the exhaust path upstream of the $NO_X$ occlusion and reduction catalyst and downstream of the $H_2$ sensor for occluding $SO_X$ of the exhaust gas in the case where the air-fuel ratio of the exhaust gas flowing into the $SO_X$ trap is a lean air-fuel ratio and releasing the occluded $SO_X$ in the case where the air-fuel ratio of the exhaust gas flowing into the $SO_X$ trap is a stoichiometric air-fuel ratio or a rich air-fuel ratio.

Namely, in this aspect of the invention, the $SO_X$ trap is arranged upstream of the $NO_X$ occlusion and reduction catalyst, and the $H_2$ sensor detects the concentration of the hydrogen component in the exhaust gas flowing into the $SO_X$ trap which occludes $SO_X$ of the exhaust gas when the exhaust air-fuel ratio is lean. By arranging the $SO_X$ trap upstream of the $NO_X$ occlusion and reduction catalyst, therefore, $SO_X$ can be removed in advance from the exhaust gas flowing into the $NO_X$ occlusion and reduction catalyst and the amount of $SO_X$ occluded by the $NO_X$ occlusion and reduction catalyst can be largely reduced.

In the case where $SO_X$ in the exhaust gas is removed by the $SO_X$ trap arranged upstream of the $NO_X$ occlusion and reduction catalyst, however, when a high temperature exhaust gas having a rich air-fuel ratio passes through the $SO_X$ trap during the $SO_X$ poisoning restoration process, the $SO_X$ occluded in the $SO_X$ trap is released, and $SO_X$ comparatively high in concentration flows into the $NO_X$ occlusion and reduction catalyst located at downstream of the $SO_X$ trap.

As described above, in the case where the exhaust gas containing $SO_X$ having a comparatively high concentration flows into the $NO_X$ occlusion and reduction catalyst, part of the $SO_X$ in the exhaust gas may be occluded in the $NO_X$ occlusion and reduction catalyst even when the exhaust gas turns rich, thereby causing the $SO_X$ poisoning of the $NO_X$ occlusion and reduction catalyst.

Also in this case, in the presence of hydrogen having a high reduction force in the exhaust gas, the release of $SO_X$ from the $SO_X$ trap is promoted on the one hand and the $SO_X$ released from the $SO_X$ trap in the presence of hydrogen is prevented from being occluded again by the $NO_X$ occlusion and reduction catalyst arranged downstream.

Also in this case, as in the invention according to claim 1, the required hydrogen concentration and the duration of the poisoning restoration process have an optimum range, and therefore, the poisoning restoration process can be executed efficiently by controlling at least one of the air-fuel ratio of the exhaust gas and the duration of the poisoning restoration process in accordance with the concentration of the hydrogen component detected by the $H_2$ sensor.

According to the another aspect of the invention, the air-fuel ratio of the exhaust gas flowing into the $NO_X$ occlusion and reduction catalyst is controlled during the execution of the $SO_X$ poisoning restoration process so that the concentration of the hydrogen component in the exhaust gas detected by the $H_2$ sensor is lower than the concentration of the hydrogen component at which hydrogen sulfide is generated by the $NO_X$ occlusion and reduction catalyst.

Namely, in this aspect of the invention, the air-fuel ratio of the exhaust gas is controlled so that the concentration of the hydrogen component in the exhaust gas detected by the $H_2$ sensor becomes a concentration range where no hydrogen sulfide is generated. As a result, hydrogen sulfide is prevented from being generated during the $SO_X$ poisoning restoration process.

According to another aspect of the invention, the air-fuel ratio of the exhaust gas flowing into the $NO_X$ occlusion and reduction catalyst is controlled during the execution of the $SO_X$ poisoning restoration process in such a manner that the concentration of the hydrogen component in the exhaust gas detected by the $H_2$ sensor is between 0.1% and 2.0%.

Namely, in this aspect of the invention, the exhaust air-fuel ratio is controlled in such a manner that the concentration of the hydrogen component in the exhaust gas is between 0.1% and 2.0%. The concentration of 2.0% of the hydrogen component is an ordinary upper limit value at which no hydrogen sulfide is generated during the $SO_X$ poisoning restoration process executed for the $NO_X$ occlusion and reduction catalyst, and the hydrogen component concentration of 0.1% is a value equivalent to the upper limit of the exhaust gas air-fuel ratio at which the $SO_X$ poisoning restoration process is possible (i.e., a stoichiometric air-fuel ratio). As a result, according to the invention of claim 4, the $SO_X$ poisoning restoration process can be executed while positively preventing the generation of hydrogen sulfide.

According to another aspect of the invention, the exhaust air-fuel ratio is controlled during the execution of the $SO_X$ poisoning restoration process in such a manner that the concentration of the hydrogen component in the exhaust gas flowing into the $NO_X$ occlusion and reduction catalyst is high at the time of starting the $SO_X$ poisoning restoration process and gradually decreases subsequently.

Namely, in this aspect of the invention, the concentration of the hydrogen component in the exhaust gas supplied to the $NO_X$ occlusion and reduction catalyst is high at the time of starting the poisoning restoration process and decreases subsequently. In the case where the exhaust gas is enriched in air-fuel ratio or increased in temperature during the $SO_X$ poisoning restoration process, a comparatively large amount of $SO_X$ is released initially from the $NO_X$ occlusion and reduction catalyst and the $SO_X$ trap, and then the amount of $SO_X$ released is gradually reduced.

In order to prevent the released $SO_X$ from being occluded again by the $NO_X$ occlusion and reduction catalyst and release $SO_X$ efficiently from the $NO_X$ occlusion and reduction catalyst, therefore, a comparatively large amount of hydrogen is required to be supplied to the $NO_X$ occlusion and reduction catalyst at the time of starting the $SO_X$ poisoning restoration process. Subsequently, the amount of $SO_X$ released decreases and therefore the amount of hydrogen supplied can be reduced correspondingly.

In this aspect of the invention, the concentration of the hydrogen component in the exhaust gas is set at a high level (at a low exhaust air-fuel ratio) at the time of starting the $SO_X$ poisoning restoration process, and the exhaust air-fuel ratio is controlled in such a manner that the concentration of the hydrogen component is subsequently reduced gradually (the exhaust air-fuel ratio is gradually increased). In this way, a sufficient amount of hydrogen to release $SO_X$ from the $NO_X$ occlusion and reduction catalyst is always supplied to the $NO_X$ occlusion and reduction catalyst while, at the same time, preventing extraneous hydrogen from being generated (the exhaust air-fuel ratio is prevented from being enriched more than necessary).

According to another aspect of the invention, the apparatus further comprises a $SO_X$ sensor arranged in the exhaust path downstream of the $NO_X$ occlusion and reduction catalyst for detecting the concentration of the sulfur oxide in the exhaust gas, wherein based on the concentration of the hydrogen component detected by the $H_2$ sensor and the $SO_X$ concentration detected by the $SO_X$ sensor, at least one of the air-fuel ratio of the exhaust gas flowing into the $NO_X$ occlusion and reduction catalyst during the execution of the $SO_X$ poisoning restoration execution and the duration of the $SO_X$ poisoning restoration process is controlled.

According to another aspect of the invention, the $SO_X$ poisoning restoration process is terminated in the case where the concentration of the hydrogen component detected by the $H_2$ sensor is higher than or equal to a predetermined first value and the concentration of the sulfur oxide detected by the $SO_X$ sensor is lower than or equal to a predetermined second value.

Namely, in these aspects of the invention, the $SO_X$ sensor is arranged downstream of the $NO_X$ occlusion and reduction catalyst in addition to the $H_2$ sensor arranged upstream of the $NO_X$ occlusion and reduction catalyst. During the $SO_X$ poisoning restoration process for the $NO_X$ occlusion and reduction catalyst, $SO_X$ is released from the $NO_X$ occlusion and reduction catalyst and, therefore, $SO_X$ is contained in the exhaust gas downstream of the $NO_X$ occlusion and reduction catalyst. Upon complete release of $SO_X$, on the other hand, the exhaust gas downstream of the $NO_X$ occlusion and reduction catalyst ceases to contain $SO_X$. Based on the output of the $SO_X$ sensor arranged downstream of the $NO_X$ occlusion and reduction catalyst, therefore, the timing of completion of the $SO_X$ poisoning restoration process (duration of the $SO_X$ poisoning restoration process) can be determined.

Namely, if the $SO_X$ concentration detected by the downstream-side $SO_X$ sensor is low, although the concentration of the hydrogen component detected by the $H_2$ sensor upstream of the $NO_X$ occlusion and reduction catalyst is higher than a predetermined value and the occluded $SO_X$ should otherwise be released from the $NO_X$ occlusion and reduction catalyst, $SO_X$ to be released is no longer occluded in the $NO_X$ occlusion and reduction catalyst. In other words, it is determined that the $SO_X$ poisoning restoration process has been completed.

As described above, according to these aspects of the invention, the $SO_X$ sensor is arranged downstream of the $NO_X$ occlusion and reduction catalyst in addition to the $H_2$ sensor arranged upstream of the $NO_X$ occlusion and reduction catalyst, and by controlling the exhaust air-fuel ratio and the duration of the poisoning restoration process in accordance with the concentration of the hydrogen component and the $SO_X$ concentration detected by them, the poisoning restoration process can be carried out efficiently.

The present invention has the advantage that the poisoning restoration process can be efficiently executed using hydrogen in the $SO_X$ poisoning restoration process for the $NO_X$ occlusion and reduction catalyst.

BEST MODE FOR CARRYING OUT THE INVENTION

Embodiments of the invention are explained below with reference to the accompanying drawings.

Figure 1:
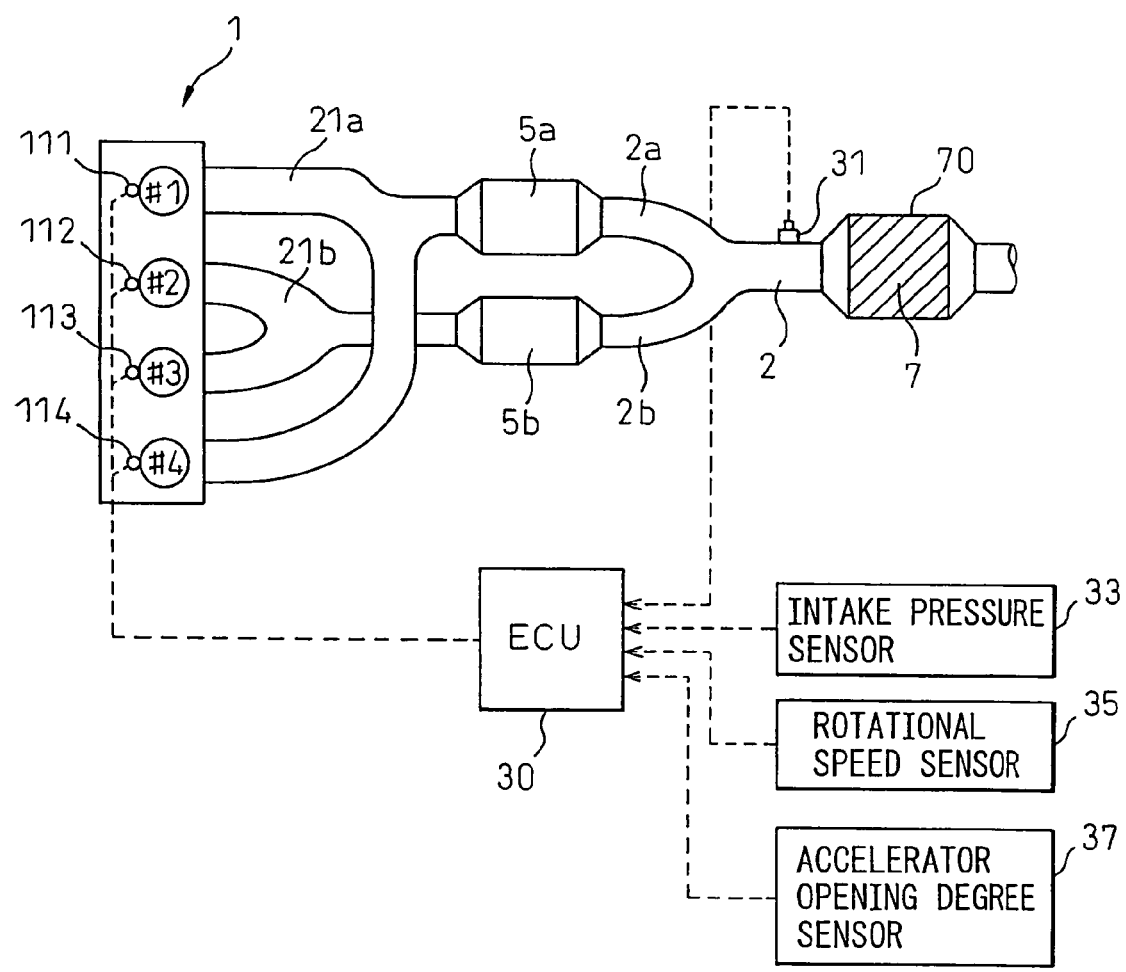
FIG. 1 is diagram for explaining a general configuration of an embodiment of this invention applied to an internal combustion engine of automotive vehicles.

FIG. 1 is a diagram for explaining a general configuration of an embodiment of the invention representing an application to the internal combustion engine of an automotive vehicle.

In FIG. 1, numeral 1 designates an internal combustion engine of an automotive vehicle. According to this embodiment, the engine 1 is a four-cylinder gasoline engine having four cylinders #1 to #4 equipped with fuel injection valves 111 to 114, respectively, for injecting the fuel into the intake ports of the respective cylinders. According to this embodiment, the engine 1 is a lean-burn engine which can be operated over a wide range of the air-fuel ratio from rich to lean state and performs the operation with the lean-burn air-fuel ratio in most of the operating areas.

Also, according to this embodiment, the cylinders #1 to #4 are divided into two cylinder groups between which the ignition timing is not continuous (according to the embodiment shown in FIG. 1, for example, the cylinders #1, #3, #4 and #2 are ignited in that order, the cylinders #1, #4 or the cylinders #2, #3 forming the same cylinder group). Also, the exhaust port of each cylinder is connected to an exhaust manifold for each cylinder group on the one hand and to an exhaust path for each cylinder group on the other hand.

In FIG. 1, numeral 21a designates an exhaust manifold for connecting the exhaust port of the cylinder group including the cylinders #1, #4 to an individual exhaust path 2a, and numeral 21b an exhaust manifold for connecting the exhaust port of the cylinder group including the cylinders #2, #4 to an individual exhaust path 2b. According to this embodiment, start catalysts 5a, 5b each consisting of a three-way catalyst are arranged on the individual exhaust paths 2a, 2b, respectively. Also, the individual exhaust paths 2a, 2b merge with a common exhaust path 2 downstream of the start catalysts. A converter 70 with the $NO_X$ occlusion and reduction catalyst accommodated in a casing described later is arranged on the common exhaust path 2.

Also, in FIG. 1, numeral 31 designates a $H_2$ sensor arranged on the exhaust path 2 near the inlet of the converter 70 for detecting the concentration of the hydrogen ($H_2$) component in the exhaust gas.

Further, numeral 30 in FIG. 1 designates an electronic control unit (ECU) of the engine 1. The ECU 30 is a microcomputer of a well-known configuration having a RAM, a ROM and a CPU according to this embodiment to perform the basic control operation including the ignition timing control and the fuel injection control of the engine 1.

Also, according to this embodiment, the ECU 30, in addition to the aforementioned basic control operation, performs the rich spike operation in which the fuel injection amount of the injection valves 111 to 114 is increased when the amount of $NO_X$ occluded in the $NO_X$ occlusion and reduction catalyst is increased to a predetermined amount, so that the engine is run in a rich air-fuel ratio for a short length of time, thereby releasing and purifying by reduction the $NO_X$ occluded by the $NO_X$ occlusion and reduction catalyst 7.

Further, according to this embodiment, the ECU 30 operates the engine in a rich air-fuel ratio in such a manner that the exhaust gas temperature increases when the amount of the sulfur oxide ($SO_X$) occluded in the $NO_X$ occlusion and reduction catalyst 7 is increased beyond a predetermined value. In this way, the $SO_X$ poisoning restoration process is executed in which a high-temperature exhaust gas having a rich air-fuel ratio is supplied to the $NO_X$ occlusion and reduction catalyst 7 and the occluded $SO_X$ is released from the $NO_X$ occlusion and reduction catalyst 7.

As described later, during the execution of the $SO_X$ poisoning restoration process, the ECU 30 controls the exhaust air-fuel ratio and the length of the processing time based on the concentration of the hydrogen component in the exhaust gas detected by the $H_2$ sensor 31.

In order to perform these control operations, the input port of the ECU 30 is supplied with signals representing the operating condition of the engine, such as a signal corresponding to the engine intake pressure from an intake pressure sensor 33 arranged in the engine intake manifold not shown, a signal corresponding to the engine speed from a rotational speed sensor 35 arranged in the neighborhood of an engine crank shaft (not shown) and a signal indicating the acceleration pedal angle (accelerator opening degree) set by the driver and sent from an acceleration pedal angle sensor 37 arranged in the neighborhood of an acceleration pedal (not shown) of the engine 1. The ECU 30 is also supplied with the $H_2$ concentration in the exhaust gas at the inlet of the $NO_X$ occlusion and reduction catalyst 7 from the $H_2$ sensor 31.

The output port of the ECU 30, on the other hand, is connected to the fuel injection valves 111 to 114 of the cylinders through a fuel injection circuit (not shown) to control the fuel injection amount and the fuel injection timing for each cylinder.

Next, the $NO_X$ occlusion and reduction catalyst 7 according to this embodiment is explained.

The $NO_X$ occlusion and reduction catalyst 7 according to this embodiment uses a carrier, made of cordierite or the like, formed in the shape of honeycomb, an alumina coating is formed on the surface of the carrier, and at least one component selected from the alkali metals such as potassium k, sodium Na, lithium Li and cesium Cs, the alkali earth group such as barium Ba and calcium Ca and the rare earth group such as lanthanum La, cerium Ce and yttrium Y is carried on the alumina layer, together with a precious metal such as platinum Pt. In the case where the exhaust gas flowing into the catalyst has a lean air-fuel ratio, the $NO_X$ occlusion and reduction catalyst absorbs the $NO_X$ ($NO_2$, NO) in the exhaust gas in the form of nitrate ions $NO_3^-$, and with the decrease in the concentration of oxygen in the exhaust gas flowing into the catalyst, releases the $NO_X$ thus absorbed.

Specifically, in the case where the engine is operated with a lean air-fuel ratio and the exhaust gas flowing into the $NO_X$ occlusion and reduction catalyst is lean in air-fuel ratio, then the $NO_X$ (NO) in the exhaust gas is oxidized on platinum Pt, for example, into $NO_2$ and, by being further oxidized, nitrate ions are generated. In the case where BaO is used as an absorbent, for example, the nitrate ions are absorbed into the absorbent and, being combined with barium oxide BaO, diffuse in the absorbent in the form of nitrate ions $NO_3^-$. As a result, in the lean atmosphere, $NO_X$ in the exhaust gas is occluded in the form of nitride in the $NO_X$ absorbent.

Also, with the considerable decrease in the oxygen concentration of the exhaust gas (i.e. in the case where the exhaust air-fuel ratio becomes a stoichiometric or rich air-fuel ratio), the amount of nitrate ions generated on platinum Pt decreases and, therefore, the reaction proceeds in the opposite direction. Thus, the nitrate ions $NO_3^-$ in the absorbent are released from the absorbent in the form of $NO_2$. In this case, in the presence of a component functioning as a reduction agent such as CO or $H_2$ or the HC component (hereinafter referred to as the reduction component) in the exhaust gas, $NO_2$ is reduced by these components on platinum Pt.

The $NO_X$ occlusion and reduction catalyst 7 so operates that the $NO_X$ in the exhaust gas is occluded in the form of nitrate ions into the absorbent (such as BaO) by the mechanism described above in the lean air-fuel ratio. With the increase in the concentration of the nitrate ions in the absorbent, therefore, nitrate ions are absorbed into the absorbent less easily, and the $NO_X$ purification rate of the exhaust gas is reduced. Once the amount of $NO_X$ occluded by the $NO_X$ occlusion and reduction catalyst reaches an upper limit value (when reaching the saturated concentration as the result of increase in the concentration of nitrate ions in the absorbent), the $NO_X$ in the exhaust gas completely ceases to be occluded.

According to this embodiment, based on the parameters indicating the engine operating conditions such as the engine intake pressure, the engine speed or the acceleration pedal angle, the ECU 30 estimates the amount of $NO_X$ generated by the engine 1 per unit time, using the relation predetermined by experiments or otherwise. Then, a predetermined proportion of the amount of $NO_X$ generated from the engine is accumulated at predetermined time intervals as an amount of $NO_X$ occluded by the $NO_X$ occlusion and reduction catalyst 7. This accumulated value (hereinafter referred to as the $NO_X$ counter) corresponds to the amount of $NO_X$ occluded by the $NO_X$ occlusion and reduction catalyst 7.

The ECU 30 further performs the rich spike operation in which the engine 1 is run with a rich air-fuel ratio for a short period of time and the exhaust gas of a rich air-fuel ratio is supplied to the $NO_X$ occlusion and reduction catalyst 7 each time the $NO_X$ counter reaches a predetermined value. Thus, the occluded $NO_X$ is released from the $NO_X$ occlusion and reduction catalyst 7, while at the same time the released $NO_X$ is purified by reduction using the reduction component contained in the exhaust gas. As a result, the $NO_X$ occlusion and reduction catalyst 7 always performs occlusion of $NO_X$ in the condition where the amount of $NO_X$ occluded by the $NO_X$ occlusion and reduction catalyst 7 is relatively small and, therefore, the $NO_X$ purification rate of the $NO_X$ occlusion and reduction catalyst 7 can be maintained at high level.

Instead of estimating the occluded $NO_X$ amount of the $NO_X$ occlusion and reduction catalyst 7 using the $NO_X$ counter, an $NO_X$ sensor for detecting the $NO_X$ concentration in the exhaust gas may be arranged on the exhaust path downstream of the $NO_X$ occlusion and reduction catalyst 7, and with the increase in the $NO_X$ concentration in the downstream exhaust gas to a predetermined value (i.e. with the increase in the amount of $NO_X$ occluded in the $NO_X$ occlusion and reduction catalyst 7, the $NO_X$ purification capacity of the $NO_X$ occlusion and reduction catalyst 7 is reduced and it is determined that the $NO_X$ component reaching the downstream side of the three-way catalyst without being occluded in the $NO_X$ occlusion and reduction catalyst 7 is increased), the aforementioned rich spike operation may be performed.

As described above, by carrying out the rich spike operation, the $NO_X$ occluded in the $NO_X$ occlusion and reduction catalyst 7 can be released with comparative ease from the $NO_X$ occlusion and reduction catalyst 7.

In the case where $SO_X$ is contained in the exhaust gas, however, the $SO_X$ is occluded by exactly the same mechanism as for $NO_X$ by the $NO_X$ occlusion and reduction catalyst 7 while the air-fuel ratio is lean.

Further, $SO_X$ has a high affinity with the occluded $NO_X$ component. Therefore, once occluded in the $NO_X$ occlusion and reduction catalyst, $SO_X$ cannot be released substantially from the $NO_X$ occlusion and reduction catalyst by the mere rich spike operation, and $SO_X$ is gradually accumulated in the catalyst. With the increase in the amount of the occluded $SO_X$, the amount of the absorbent which can participate in the $NO_X$ occlusion is relatively reduced. Therefore, the upper limit of the occluded $NO_X$ amount is reduced, thereby reducing the occlusion capacity of the $NO_X$ occlusion and reduction catalyst 7 (i.e. the $SO_X$ poisoning results).

In the case where the $NO_X$ occlusion and reduction catalyst is used, therefore, it is common practice to execute the $SO_X$ poisoning restoration process and release $SO_X$ from the $NO_X$ occlusion and reduction catalyst each time the $SO_X$ occluded in the catalyst increases to a certain degree.

In the $SO_X$ poisoning restoration process, the engine is run with a rich air-fuel ratio while the exhaust temperature increases, so that the $NO_X$ occlusion and reduction catalyst is held in an atmosphere high in temperature and rich in air-fuel ratio.

Specifically, in the $SO_X$ poisoning restoration process, the sulfide generated by increasing the temperature of the $NO_X$ occlusion and reduction catalyst is decomposed and $SO_X$ is released from the catalyst, so that the $SO_X$ released is prevented from being occluded again into the $NO_X$ occlusion and reduction catalyst by maintaining the $NO_X$ occlusion and reduction catalyst in a rich air-fuel ratio. Actually, however, the $SO_X$ has so strong an affinity with the occluded $NO_X$ component as described above that the problem is posed that the $SO_X$ released from the upstream side of the $NO_X$ occlusion and reduction catalyst, though maintained in a rich air-fuel ratio, is occluded again on the downstream side thereof. As a result, the $SO_X$ occluded on the upstream side of the $NO_X$ occlusion and reduction catalyst is alternately released and occluded while gradually moving downstream. Therefore, it is considerable time before $SO_X$ is completely released from the catalyst.

Thus, a comparatively long time is required for the $SO_X$ poisoning restoration process, and the engine fuel cost is increased and the $NO_X$ occlusion and reduction catalyst is exposed to high temperature for a longer time, thereby deteriorating the catalyst.

It is known that the $SO_X$ poisoning restoration process can be efficiently executed by supplying hydrogen ($H_2$) to the $NO_X$ occlusion and reduction catalyst. The hydrogen $H_2$ has a very high reduction strength, and therefore promotes the release of $SO_X$ from the $NO_X$ occlusion and reduction catalyst while, at the same time, preventing the released $SO_X$ from being occluded again by the $NO_X$ occlusion and reduction catalyst. By supplying $H_2$ to the $NO_X$ occlusion and reduction catalyst during the poisoning restoration process, therefore, $SO_X$ can be completely released from the $NO_X$ occlusion and reduction catalyst within a short length of time.

As a method of supplying $H_2$ to the $NO_X$ occlusion and reduction catalyst, $H_2$ is added to the exhaust gas from an external source as described above or the internal combustion engine is operated in the rich air-fuel ratio while at the same time using a three-way catalyst or a hydrogen generating catalyst.

According to this embodiment, as shown in FIG. 1, three-way catalysts are arranged as start catalysts 5a, 5b upstream of the $NO_X$ occlusion and reduction catalyst 7. Once the engine 1 is run in the rich air-fuel ratio to execute the $SO_X$ poisoning restoration process, therefore, hydrogen is generated by the start catalysts 5a, 5b.

Figure 2:
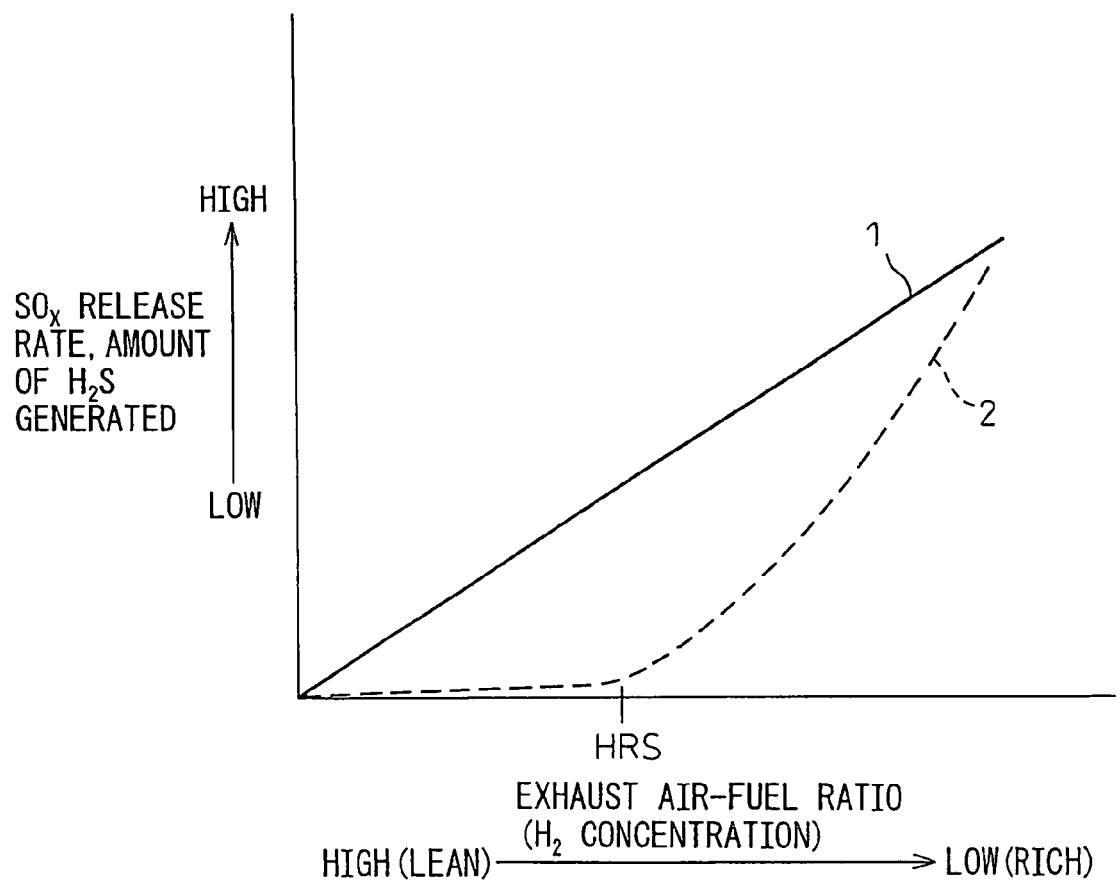
FIG. 2 is a diagram showing the relation between the exhaust air-fuel ratio and the amount of $H_2$ generated.

FIG. 2 is a diagram showing the relation between the exhaust air-fuel ratio and the amount of $H_2$ generated. The diagram of FIG. 2 schematically shows the amount of $H_2$ generated in the start catalysts 5a, 5b. The amount of $H_2$ generated in the three-way catalyst, as indicated by solid line 1 in FIG. 2, increases substantially linearly with the enrichment of the air-fuel ratio (with the decrease in the air-fuel ratio). Though different in quantity, the amount of $H_2$ generated by the engine itself or the amount of $H_2$ generated by the $H_2$ generating catalyst also increases linearly substantially with the decrease in air-fuel ratio.

According to the embodiment shown in FIG. 1, therefore, the amount of $H_2$ generated (concentration of the hydrogen component in the exhaust gas) can be changed by changing the air-fuel ratio of the engine 1 in operation.

The amount of $SO_X$ released per unit time from the $NO_X$ occlusion and reduction catalyst (i.e., $SO_X$ release rate) during the $SO_X$ poisoning restoration process is proportional to the concentration of the hydrogen component in the exhaust gas. As a result, the $SO_X$ release rate also substantially linearly changes with the air-fuel ratio as shown by solid line 1 in FIG. 2. For the sole purpose of releasing the $SO_X$ rapidly from the $NO_X$ occlusion and reduction catalyst, therefore, the concentration of the hydrogen component of the exhaust gas is desirably higher.

In the actual operation, however, once the $H_2$ concentration rises beyond a certain level during the $SO_X$ poisoning restoration process, the problem that the released $SO_X$ reacts further with $H_2$ and generates hydrogen sulfide $H_2S$ occurs. The dotted line 2 in FIG. 2 shows the relation between the exhaust air-fuel ratio (i.e. $H_2$ concentration) and the amount of $H_2S$ generated in the $NO_X$ occlusion and reduction catalyst during the $SO_X$ poisoning restoration process. As shown by dotted line 2 in FIG. 2, once the $H_2$ concentration of the exhaust gas (exhaust air-fuel ratio) exceeds a certain critical value (indicated by HRS in FIG. 2), $H_2S$ begins to be generated at a larger rate by the $NO_X$ occlusion and reduction catalyst, and subsequently, with the increase in $H_2$ concentration, the amount of $H_2S$ generated increases. It is necessary, therefore, to maintain the $H_2$ concentration in the exhaust gas at a level lower than the critical value HRS of $H_2S$ generation during the $SO_X$ poisoning restoration process.

In the case where the concentration of the hydrogen component is too low, on the other hand, the $SO_X$ release rate is reduced, thereby posing the problem of a longer time taken for the poisoning restoration process.

Specifically, in order to execute the $SO_X$ poisoning restoration process for the $NO_X$ occlusion and reduction catalyst efficiently, the concentration of the hydrogen component in the exhaust gas supplied to the $NO_X$ occlusion and reduction catalyst is required to be controlled within an appropriate range.

According to this embodiment, the concentration of the hydrogen component ($H_2$ concentration) in the exhaust gas is detected by the $H_2$ sensor 31 arranged at the inlet of the $NO_X$ occlusion and reduction catalyst 7, and based on the detected $H_2$ concentration, the $SO_X$ poisoning restoration process is performed, thereby making it possible to execute the $SO_X$ poisoning restoration process for the $NO_X$ occlusion and reduction catalyst efficiently.

According to this embodiment, the $H_2$ sensor 31 may use a material such as a Pd/Ni alloy which uniquely responds to only hydrogen.

The $H_2$ sensor of this type is marketed by Toyota Microsystems Co., Ltd. (Tokyo) and commercially available in the trade name "$H_2$scan", for example. However, the $H_2$ sensor which can be used in the present invention is not limited to this type of $H_2$ sensor and any type of sensor capable of continuously monitoring the $H_2$ concentration with a high responsiveness can be used in the present invention.

Next, the operation of controlling the $SO_X$ poisoning restoration process using the $H_2$ sensor according to this embodiment is explained.

Figure 3:
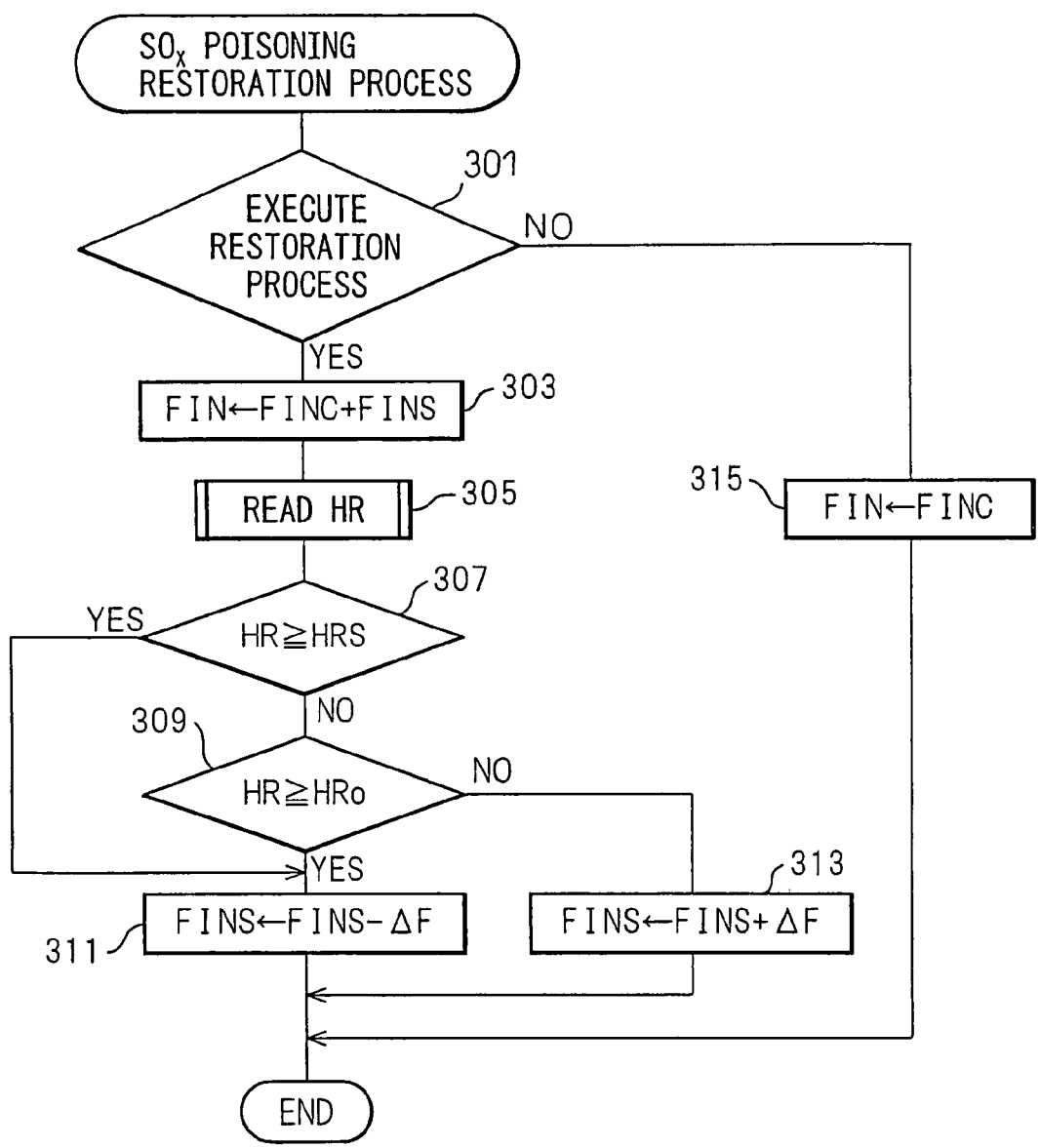
FIG. 3 is a flowchart showing an example of the $SO_X$ poisoning restoration process using the $H_2$ sensor.

FIG. 3 is a flowchart showing an example of the operation for the $SO_X$ poisoning restoration process using the $H_2$ sensor. This operation is performed as a routine at predetermined time intervals by the ECU 30.

In this operation, the ECU 30 controls the air-fuel ratio of the engine (exhaust air-fuel ratio) in such a manner that the $H_2$ concentration HR in the exhaust gas detected by the $H_2$ sensor 31 at the inlet of the $NO_X$ occlusion and reduction catalyst 7 during the $SO_X$ poisoning restoration process reaches a predetermined target value ($HR_0$). Also, in the case where the $H_2$ concentration HR exceeds the critical value which generates $H_2S$ for some reason, the air-fuel ratio is increased (changed toward the lean state) thereby to prevent generation of $H_2S$.

Specifically, once the operation shown in FIG. 3 is started, step 301 first determines whether or not the $SO_X$ poisoning restoration process is undergoing. According to this embodiment, the ECU 30 accumulates the $SO_X$ counter corresponding to the occluded $SO_X$ amount by a method similar to the aforementioned $NO_X$ counter through the occluded $SO_X$ amount calculating operation not shown, and executes the $SO_X$ poisoning restoration process each time the $SO_X$ counter reaches a predetermined value. Instead of using the $SO_X$ counter, the $SO_X$ poisoning restoration process can be executed at regular time intervals every time when the engine is operated for a predetermined length of time or the vehicle covers a predetermined distance.

Step 301 determines whether or not the $SO_X$ poisoning restoration process is being executed, and in the case where the $SO_X$ poisoning restoration process is not under way, the fuel injection amount FIN of the engine is set to FINC at step 315. FINC represents the fuel injection amount calculated based on the engine operating condition (accelerator opening degree, engine speed, etc.) by the fuel injection amount calculating operation, not shown, of the ECU 30. In other words, the fuel injection amount is set to the normal value as long as the $SO_X$ poisoning restoration process is not under way.

In the case where the $SO_X$ poisoning restoration process is under way as determined at step 301, on the other hand, the fuel injection amount FIN is increased by a predetermined amount FINS from FINC at the next step 303. FINS is preset as a sufficient amount to increase the engine exhaust temperature and enrich the air-fuel ratio. In other words, the engine is operated with a high exhaust temperature and a rich exhaust air-fuel ratio during the execution of the $SO_X$ poisoning restoration process.

Next, the $H_2$ concentration HR of the exhaust gas at the inlet of the $NO_X$ occlusion and reduction catalyst 7 is read from the $H_2$ sensor 31 at step 305, followed by step 307 for determining whether the $H_2$ concentration HR is not lower than the lower limit value HRS at which $H_2S$ is generated. In the case where HR≧HRS, the process proceeds to step 311 at which the fuel increase value FINS during the $SO_X$ poisoning restoration process is reduced by a predetermined value ΔF.

As a result of this operation, in the case where the $H_2S$ concentration is higher than the critical value of $H_2S$ generation, the fuel injection amount is reduced by a predetermined amount ΔF each time this operation is executed until the $H_2$ concentration is reduced below the critical value of $H_2S$ generation.

In the case where HR<HRS at step 307, on the other hand, the operation of steps 309 to 313 is performed so that the fuel injection increase amount FINS is changed by ΔF to reach a predetermined target value $HR_0$ of the $H_2$ concentration HR. During the execution of the $SO_X$ poisoning restoration process, therefore, the engine air-fuel ratio is maintained at about the target value $HR_0$ in the range where no $H_2S$ is generated.

According to this embodiment, the $SO_X$ poisoning restoration process is continued for a predetermined length of time, and upon lapse of the predetermined length of time, the poisoning restoration process is terminated, followed by step 315 at which the air-fuel ratio is restored to the value for normal operation. The target $H_2$ concentration value $HR_0$ for the poisoning restoration process is set to a sufficient value to release the whole amount of $SO_X$ occluded in the $NO_X$ occlusion and reduction catalyst 7 during the poisoning restoration process.

The target concentration $HR_0$ is determined in accordance with the frequency with which the $SO_X$ poisoning restoration process is executed (the amount of $SO_X$ occluded by the $NO_X$ occlusion and reduction catalyst at the time of starting the poisoning restoration process) and the duration of the $SO_X$ poisoning restoration process. During the poisoning restoration process, however, the air-fuel ratio is required to be at least not more than the stoichiometric value (rich air-fuel ratio), and the upper limit of the $H_2$ concentration is required to be lower than the critical $H_2$ concentration value for $H_2S$ generation. Thus, the target value $HR_0$ of the $H_2$ concentration is set to a range between 0.1% and 2.0% inclusive.

In this case, the $H_2$ concentration of 0.1% substantially corresponds to a case in which the exhaust air-fuel ratio is the stoichiometric air-fuel ratio, and 2.0% corresponds to a value for the lower limit of the $H_2$ concentration where $H_2S$ begins to be generated by the $NO_X$ occlusion and reduction catalyst.

Figure 4:
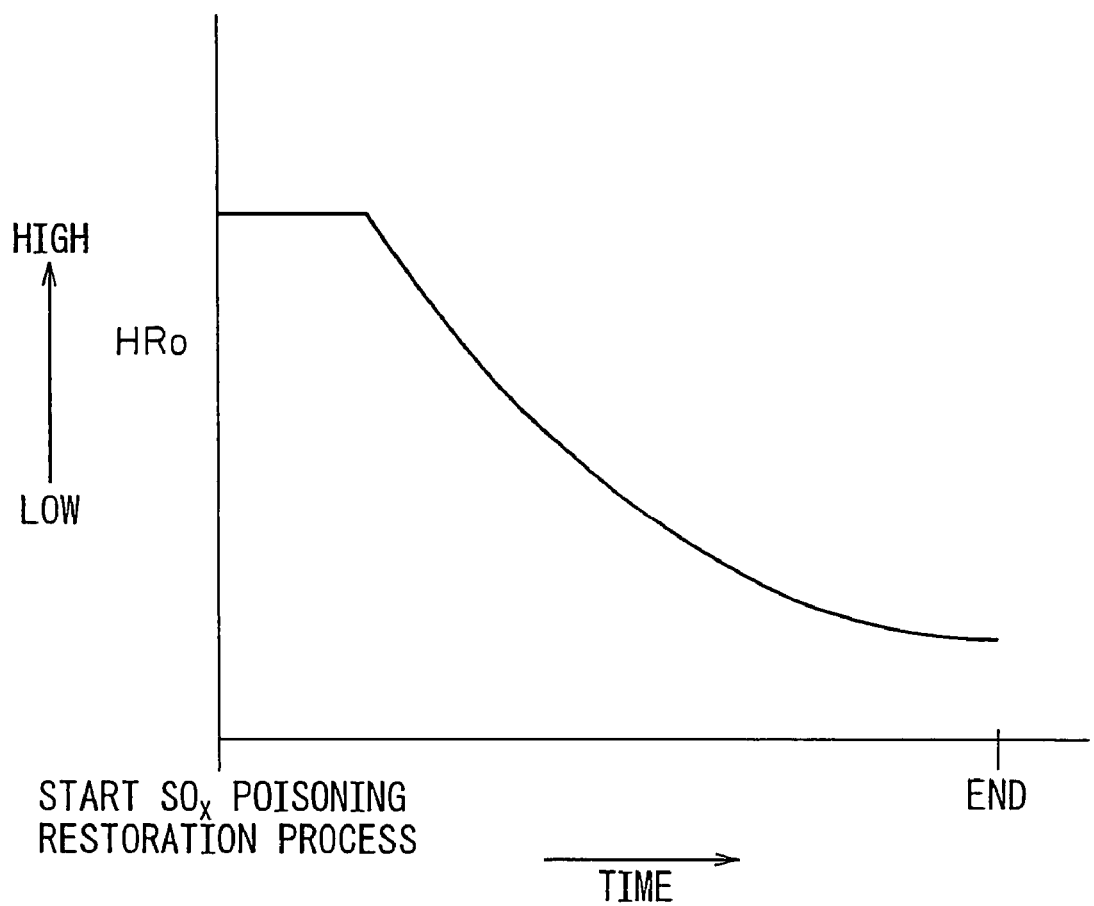
FIG. 4 is a diagram showing an example of setting a $H_2$ concentration target value for the poisoning restoration process.

The $H_2$ concentration target value $HR_0$ for the poisoning restoration process, which may be a predetermined value, may alternatively be maintained at a high value for a predetermined time after start of the poisoning restoration process and gradually decreased thereafter, as shown in FIG. 4.

Normally, in the case where the $SO_X$ poisoning restoration process is started and the high-temperature and rich air-fuel ratio exhaust gas begins to be supplied to the $NO_X$ occlusion and reduction catalyst, $SO_X$ adsorbed on the surface of platinum, etc. is rapidly released before the $SO_X$ occluded in the form of sulfide by the adsorbent such as BaO. Immediately after start of the $SO_X$ poisoning restoration process, therefore, a comparatively large amount of $SO_X$ is released from the $NO_X$ occlusion and reduction catalyst, after which the amount of $SO_X$ released gradually decreases.

By supplying a comparatively large amount of $H_2$ to the $NO_X$ occlusion and reduction catalyst at the time of starting the $SO_X$ poisoning restoration process, therefore, the comparatively large amount of $SO_X$ released initially can be prevented from being occluded again by the $NO_X$ occlusion and reduction catalyst, thereby making it possible to complete the $SO_X$ poisoning restoration process within a short period of time.

Therefore, as shown in FIG. 4, for example, the $H_2$ concentration target value $HR_0$ is set high at the start of the poisoning restoration process and, subsequently, is gradually decreased with the lapse of time. In this way, an appropriate amount of $H_2$, without overage or shortage, can be supplied to the $NO_X$ occlusion and reduction catalyst in accordance with the $SO_X$ release situation. Thus, the $SO_X$ poisoning restoration process for the $NO_X$ occlusion and reduction catalyst can be efficiently conducted while at the same time preventing the fuel cost from increasing.

Figure 5:
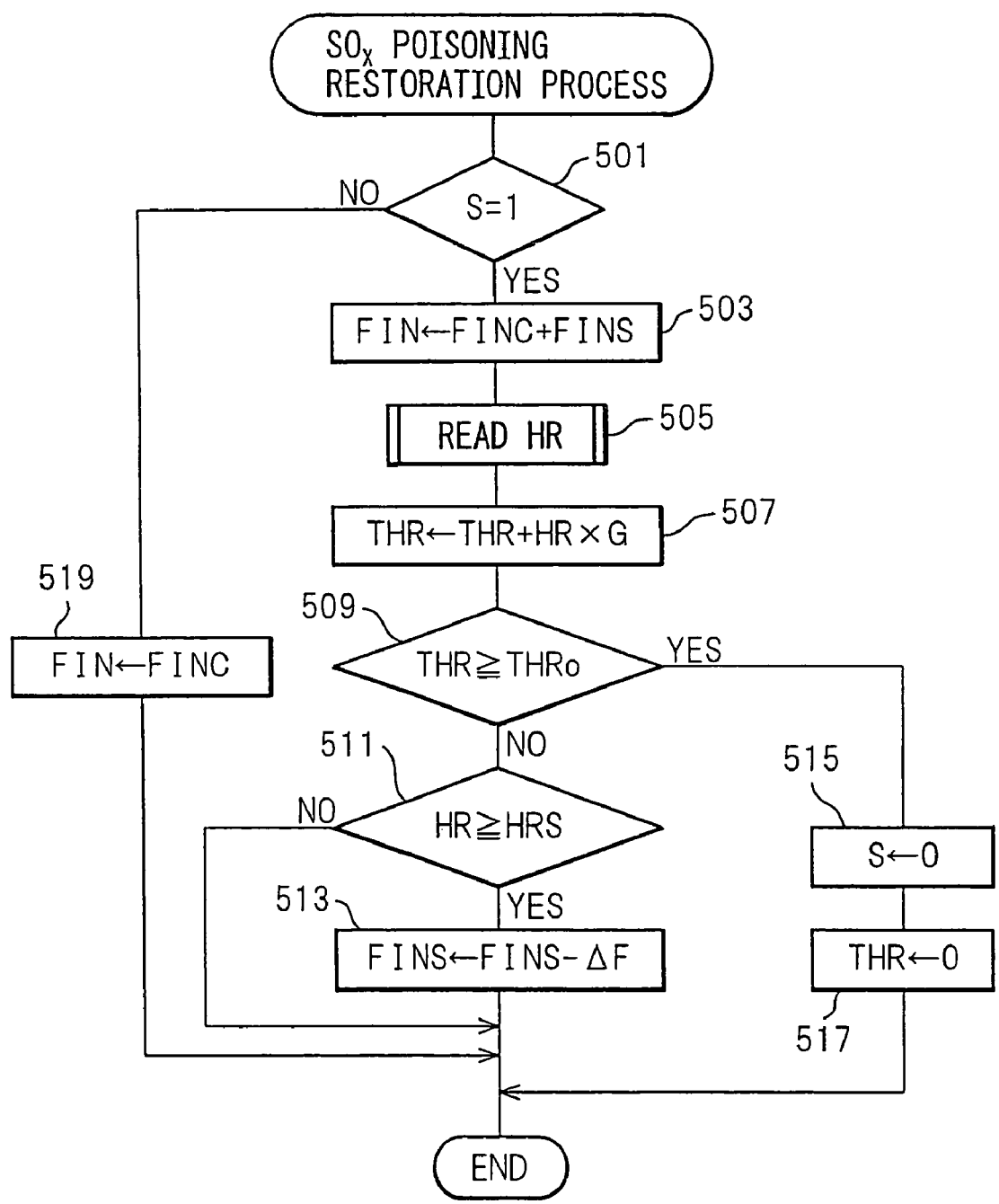
FIG. 5 is a flowchart of an embodiment different from FIG. 3 showing the $SO_X$ poisoning restoration process using the $H_2$ sensor.

FIG. 5 is a flowchart showing the $SO_X$ poisoning restoration process according to another embodiment different from the embodiment shown in FIG. 3.

The operation shown in FIG. 5 is also conducted as a routine at predetermined time intervals by the ECU 30.

In the processing operation shown in FIG. 3, the duration of the $SO_X$ poisoning restoration process is set to a predetermined time in advance, and the target value $HR_0$ of the $H_2$ concentration is set to release the whole amount of $SO_X$ occluded in the $NO_X$ occlusion and reduction catalyst within the particular predetermined time.

In the operation shown in FIG. 5, in contrast, the $H_2$ concentration, though limited to a value lower than the critical value of $H_2S$ generation, is not controlled at the target value $HR_0$, but to a value corresponding to the prevailing operating conditions. In the operation shown in FIG. 5, as described above, the $H_2$ concentration changing with the operating conditions is detected by the $H_2$ sensor 31 and, from this $H_2$ concentration, the amount of $H_2$ supplied to the $NO_X$ occlusion and reduction catalyst 7 is determined. Then, the $SO_X$ poisoning restoration process is continued until the total amount of $H_2$ supplied reaches a value sufficient to release the whole amount of $SO_X$ occluded in the $NO_X$ occlusion and reduction catalyst 7.

In this way, in the process shown in FIG. 5, the duration of the $SO_X$ poisoning restoration process is controlled by the $H_2$ concentration detected by the $H_2$ sensor 31.

Once the process shown in FIG. 5 is started, step 501 determines whether or not the value of the flag S is set to 1. The flag S is for indicating whether the execution of the $SO_X$ poisoning restoration process is required or not, and is set to 1 upon determination by the separate operation of the ECU 30 that the amount of $SO_X$ occluded in the $NO_X$ occlusion and reduction catalyst 7 has reached a predetermined value (in the case where the value of the $SO_X$ counter described above has reached a predetermined value, for example). Also, the value of the flag S is reset to 0 at step 515 upon determination that the $SO_X$ poisoning restoration process is completed by this operation.

In the case where S≠1 at step 501, i.e. in the case where the execution of the $SO_X$ poisoning restoration process is not currently required, step 519 is executed, and the fuel injection amount FIN of the engine 1 is set to the value FINC calculated by the fuel injection amount calculating operation executed by the ECU 30.

In the case where S=1 at step 501, on the other hand, the execution of the $SO_X$ poisoning restoration process is required, and therefore the process proceeds to step 503 where the fuel injection amount is increased by FINS, so that the engine is run with the exhaust gas in rich air-fuel ratio and high in temperature. FINS at step 503 is an amount similar to that at step 303.

Next, at step 505, the $H_2$ concentration HR in the exhaust gas at the inlet of the $NO_X$ occlusion and reduction catalyst is read from the $H_2$ sensor 31, and at step 507, the value equal to the $H_2$ concentration HR multiplied by the engine intake air amount G is estimated thereby to determine the estimated value THR. The intake air amount G substantially corresponds to the exhaust flow rate, and therefore, the value equal to the $H_2$ concentration HR multiplied by G corresponds to the amount of $H_2$ flowing into the $NO_X$ occlusion and reduction catalyst per unit time. The estimated value THR is reset to zero at step 517 upon completion of the $SO_X$ poisoning restoration process. The estimated value THR calculated at step 507, therefore, corresponds to the total amount of the hydrogen component supplied to the $NO_X$ occlusion and reduction catalyst 7 from the time of starting the current session of the $SO_X$ poisoning restoration process to the present time point.

The intake air amount G is calculated based on the intake air pressure detected by the intake air pressure sensor 33 and the engine speed detected by the rotational speed sensor 35 by the calculating operation, not shown, conducted separately by the ECU 30.

After calculating the estimated value THR at step 507, step 509 determines whether the estimated value THR has reached a predetermined value $THR_0$ and, if $THR \geq THR_0$, the flag S and the estimated value THR are set to zero at steps 515, 517. As a result, in the subsequent operation shown in FIG. 5, step 519 is executed after step 501, thereby completing the $SO_X$ poisoning restoration process.

The judgment value $THR_0$ corresponds to a sufficient amount of $H_2$ to release and reduce the whole amount of $SO_X$ occluded by the $NO_X$ occlusion and reduction catalyst 7, and is determined by the type of the $NO_X$ occlusion and reduction catalyst 7 and the number of times the $SO_X$ poisoning restoration process is executed (the occluded $SO_X$ amount as of the time of starting the $SO_X$ poisoning restoration process). Therefore, the judgment value $THR_0$ is desirably determined by experiments using the actual $NO_X$ occlusion and reduction catalyst and the engine.

In the case where $THR<THR_0$ at step 509, the $SO_X$ poisoning restoration process is not completed and therefore, the current session of operation is terminated after executing steps 511, 513.

Steps 511, 513 are the same operation as steps 307, 311 shown in FIG. 3, whereby the exhaust air-fuel ratio is controlled in such a manner that the $H_2$ concentration of the exhaust gas may not exceed the critical value of $H_2S$ generation.

Incidentally, in the operation shown in FIG. 5, the duration of the $SO_X$ poisoning restoration process is determined based on the accumulated value of the hydrogen component amount flowing into the $NO_X$ occlusion and reduction catalyst 7. As an alternative, the relation between the $H_2$ concentration in the exhaust gas and the duration of the $SO_X$ poisoning restoration process is determined in advance and, then, the duration of the $SO_X$ poisoning restoration process is determined directly from the $H_2$ concentration HR detected by the $H_2$ sensor.

Next, another example of the configuration of the exhaust gas purification apparatus according to the invention different from the apparatus shown in FIG. 1 is explained with reference to FIG. 6.

Figure 6:
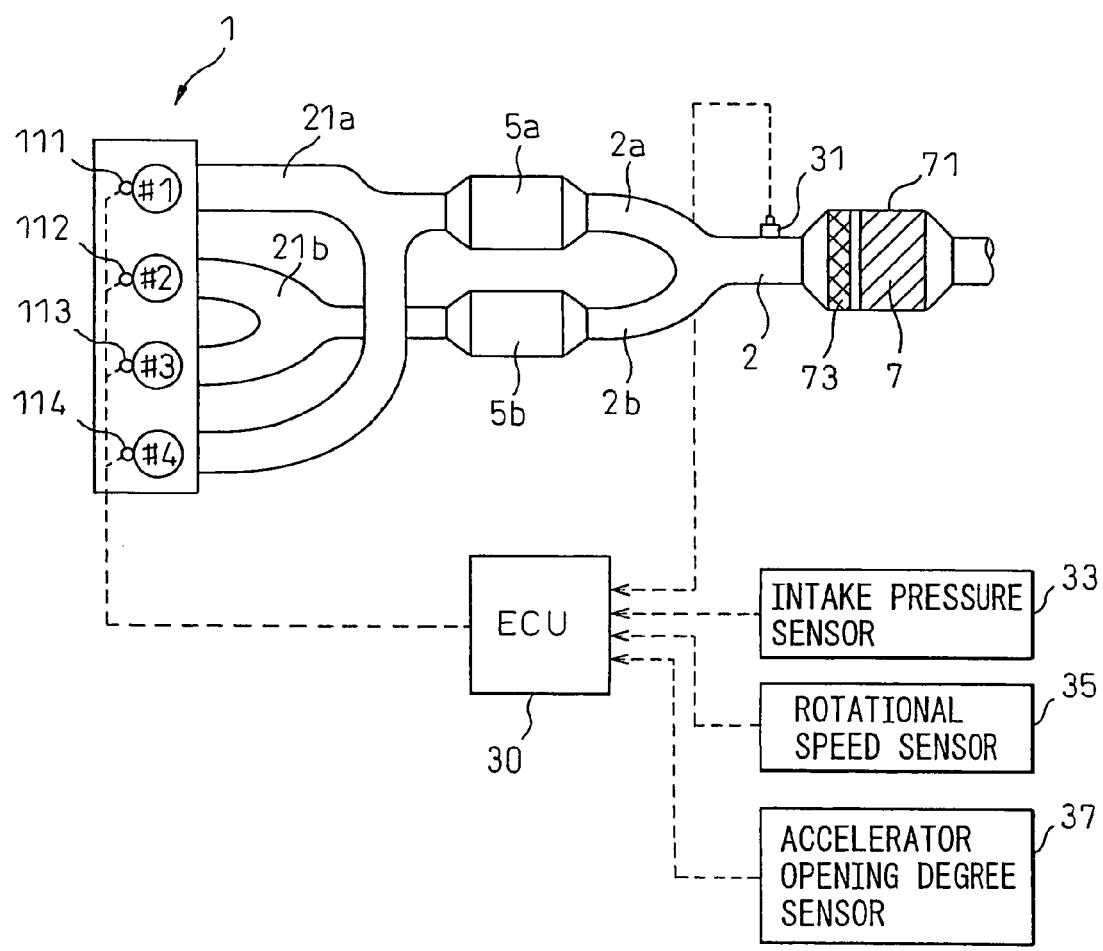
FIG. 6 is a diagram for explaining a general configuration of an embodiment different from FIG. 1 applied to the internal combustion engine of automotive vehicles.

FIG. 6 is a diagram similar to FIG. 1 and shows a general configuration of the invention as applied to the internal combustion engine of the automotive vehicle. In FIG. 6, the same reference numerals as in FIG. 1 designate similar component elements, respectively.

The configuration shown in FIG. 6 is different from that of FIG. 1 only in that a $SO_X$ trap 73 is arranged in the exhaust path upstream of the $NO_X$ occlusion and reduction catalyst 7 and downstream of the $H_2$ sensor 31.

The $SO_X$ trap 73 occludes $SO_X$ in the exhaust gas when the air-fuel ratio of the exhaust gas flowing into the $SO_X$ trap is lean and releases the occluded $SO_X$ into the exhaust gas in the form of $SO_2$, for example, when the air-fuel ratio of the exhaust gas flowing into the $SO_X$ trap is enriched.

The $SO_X$ trap 73 uses an alumina carrier and at least one of the component selected from alkali metals such as potassium K, sodium Na, lithium Li and cesium Cs and the alkaline earth group such as calcium Ca, is carried on the alumina carrier together with a precious metal such as platinum Pt, palladium Pd, rhodium Rh or iridium Ir.

The $SO_X$ trap 73 holds $SO_X$ in the form of sulfate ions $SO_4^-$ or a sulfide, if formed, in an unstable state in the $SO_X$ trap.

Taking a case where platinum Pt and calcium Ca are carried on the carrier as an example, as long as the exhaust air-fuel ratio is lean, the $SO_x$ ($SO_2$, for example) in the exhaust gas is oxidized on the surface of platinum Pt while at the same time being absorbed and diffused in the calcium oxide CaO in the form of sulfate ions $SO_4^{2-}$ thereby to form calcium sulfide $CaSO_4$. Calcium sulfide is comparatively unstable, and therefore, once the air-fuel ratio of the exhaust gas is enriched and the oxygen concentration of the exhaust gas is reduced, is easily decomposed ($CaSO_4 \rightarrow Ca^{2+} + SO_4^{2-}$) and sulfate ions $SO_4^{2-}$ are released in the form of $SO_x$ ($SO_2$) from the $SO_x$ trap at higher than a predetermined temperature.

In the case where the $SO_X$ trap 73 is arranged upstream of the $NO_X$ occlusion and reduction catalyst 7, a larger proportion of $SO_X$ in the exhaust gas is occluded in the $SO_X$ trap 73 and most of the $SO_X$ component substantially fails to reach the downstream side $NO_X$ occlusion and reduction catalyst 7 when the exhaust air-fuel ratio is lean.

As a result, the frequency of executing the $SO_X$ poisoning restoration process for the $NO_X$ occlusion and reduction catalyst 7 is maintained low. Thus, the increased fuel consumption for supplying the exhaust gas high in temperature and rich in air-fuel ratio to the $NO_X$ occlusion and reduction catalyst 7 and the degeneration of the $NO_X$ occlusion and reduction catalyst 7 due to the high temperature, can be suppressed.

Although FIG. 6 shows a case in which the $NO_X$ occlusion and reduction catalyst 7 and the $SO_X$ trap 73 are arranged in proximity to each other in the same casing 71. As far as they are located between the $H_2$ sensor 31 and the $NO_X$ occlusion and reduction catalyst 7, however, the $SO_X$ trap 73 may be arranged by being accommodated in a different casing than the $NO_X$ occlusion and reduction catalyst 7.

As described above, the provision of the $SO_X$ trap 73 upstream of the $NO_X$ occlusion and reduction catalyst 7 can suppress the increased fuel consumption by the engine and the degeneration of the catalyst. Also in this case, however, the problem of the repeated occlusion of $SO_X$ during the $SO_X$ poisoning restoration process may occur.

Specifically, the problem that $SO_X$ of comparatively high concentration released from the $SO_X$ trap 73 during the $SO_X$ poisoning restoration process is occluded again in the $NO_X$ occlusion and reduction catalyst occurs even in the case where the air-fuel ratio is rich in the downstream-side $NO_X$ occlusion and reduction catalyst. Thus, by alternating between re-occlusion in and release from the $NO_X$ occlusion and reduction catalyst, $SO_X$ is gradually transferred to downstream through the $NO_X$ occlusion and reduction catalyst, and therefore the $SO_X$ poisoning restoration process takes a comparatively long time.

Also in the case where the $SO_X$ trap is arranged upstream of the $NO_X$ occlusion and reduction catalyst as shown in FIG. 6, therefore, the $SO_X$ is prevented from being occluded in the $NO_X$ occlusion and reduction catalyst 7 again by supplying hydrogen to the $NO_X$ occlusion and reduction catalyst 7 during the $SO_X$ poisoning restoration process.

Incidentally, also with the configuration shown in FIG. 6, the $SO_X$ poisoning restoration process can be carried out more efficiently by controlling the engine air-fuel ratio or the duration of the $SO_X$ poisoning restoration process during the $SO_X$ poisoning restoration process. The operation of controlling the poisoning restoration process based on the $H_2$ concentration in the configuration of FIG. 6 is similar to that for the configuration shown in FIG. 3 and, therefore, is not explained again.

Next, still another example of the configuration of the exhaust gas purification apparatus according to the invention is explained with reference to FIG. 7.

Figure 7:
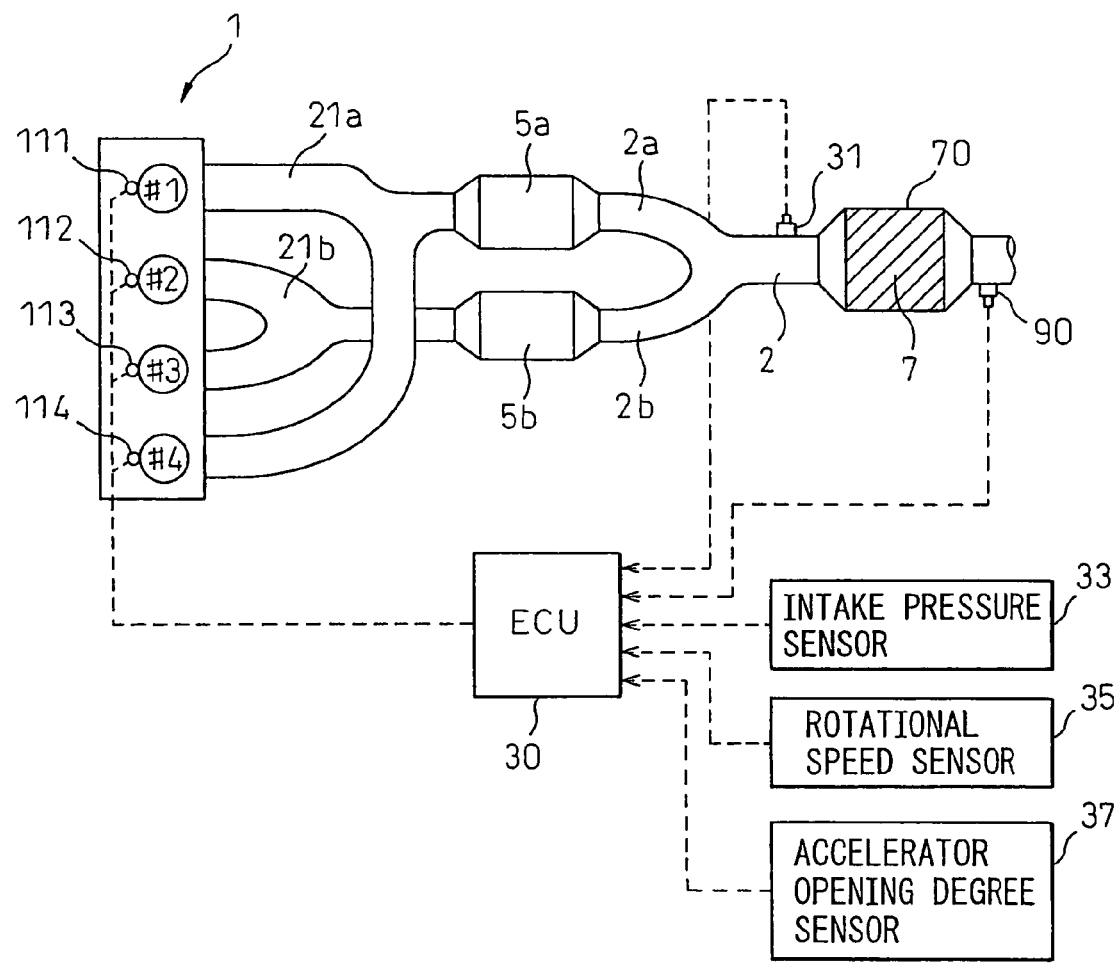
FIG. 7 is a diagram for explaining a general configuration of an embodiment different from FIGS. 1 and 6 applied to the internal combustion engine of automotive vehicles.

FIG. 7 is a diagram similar to FIG. 1 and shows a general configuration of an application of the invention to the internal combustion engine of an automotive vehicle. In FIG. 7, the same reference numerals as in FIG. 1 designate similar elements to those, respectively, in FIG. 1.

The configuration shown in FIG. 7 is different from that of FIG. 1 only in that, in addition to the $H_2$ sensor 31 arranged upstream of the $NO_X$ occlusion and reduction catalyst 7, a $SO_X$ sensor 90 capable of detecting the concentration of a sulfur oxide ($SO_X$ concentration) in the exhaust gas is arranged in the exhaust path downstream of the $NO_X$ occlusion and reduction catalyst 7.

The $SO_X$ sensor 90 according to this embodiment is required to be capable of detecting the $SO_X$ concentration of the exhaust gas continuously with high response. However, a $SO_X$ sensor meeting this requirement has yet to become commercially available. This embodiment can be implemented when such a $SO_X$ sensor comes to find practical application.

According to this embodiment, in addition to the $H_2$ concentration of the exhaust gas detected by the $H_2$ sensor on the upstream side of the $NO_X$ occlusion and reduction catalyst 7, the $SO_X$ concentration detected by the $SO_X$ sensor 90 arranged downstream of the $NO_X$ occlusion and reduction catalyst 7 is used to control the air-fuel ratio and the duration of the $SO_X$ poisoning restoration process.

Specifically, according to this embodiment, the exhaust air-fuel ratio is controlled based on the output of the upstream-side $H_2$ sensor 31 in such a manner that the $H_2$ concentration of the exhaust gas flowing into the $NO_X$ occlusion and reduction catalyst is maintained in a predetermined range on the one hand and, in the case where the upstream-side $H_2$ concentration is in a predetermined range and the $SO_X$ concentration detected by the downstream-side $SO_X$ sensor 90 is not more than a predetermined value at the same time, then it is determined that the $SO_X$ poisoning restoration process is completed.

During the $SO_X$ poisoning restoration process, the exhaust gas containing the $H_2$ component is supplied to the $NO_X$ occlusion and reduction catalyst 7, so that the released $SO_X$ is prevented from being occluded again and therefore discharged downstream of the $NO_X$ occlusion and reduction catalyst 7 together with the exhaust gas. In the case where the $H_2$ concentration in the exhaust gas is not less than a certain level and as long as $SO_X$ continues to be released from the $NO_X$ occlusion and reduction catalyst 7, therefore, $SO_X$ is detected in the exhaust gas downstream of the $NO_X$ occlusion and reduction catalyst 7.

As a result, in the case where $SO_X$ is not substantially detected by the $SO_X$ sensor 90 downstream of the $NO_X$ occlusion and reduction catalyst 7 in spite of the fact that the $H_2$ concentration of the exhaust gas is not less than a predetermined value, it can be determined that the $SO_X$ occluded in the $NO_X$ occlusion and reduction catalyst 7 is completely released.

According to this embodiment, in the case where the $SO_X$ concentration detected by the $SO_X$ sensor downstream of the $NO_X$ occlusion and reduction catalyst 7 after starting the $SO_X$ poisoning restoration process is reduced to below a predetermined value, the $SO_X$ poisoning restoration process is terminated.

In this way, the completion of the $SO_X$ poisoning restoration process can be determined accurately, and the $SO_X$ poisoning restoration process can be appropriately completed. Thus, an increase in engine fuel consumption and the degeneration of the $NO_X$ occlusion and reduction catalyst which otherwise might be caused by the progress of the $SO_X$ poisoning due to the termination of the $SO_X$ poisoning restoration process before sufficient $SO_X$ release or the unnecessarily protracted $SO_X$ poisoning restoration process can be suppressed.

Figure 8:
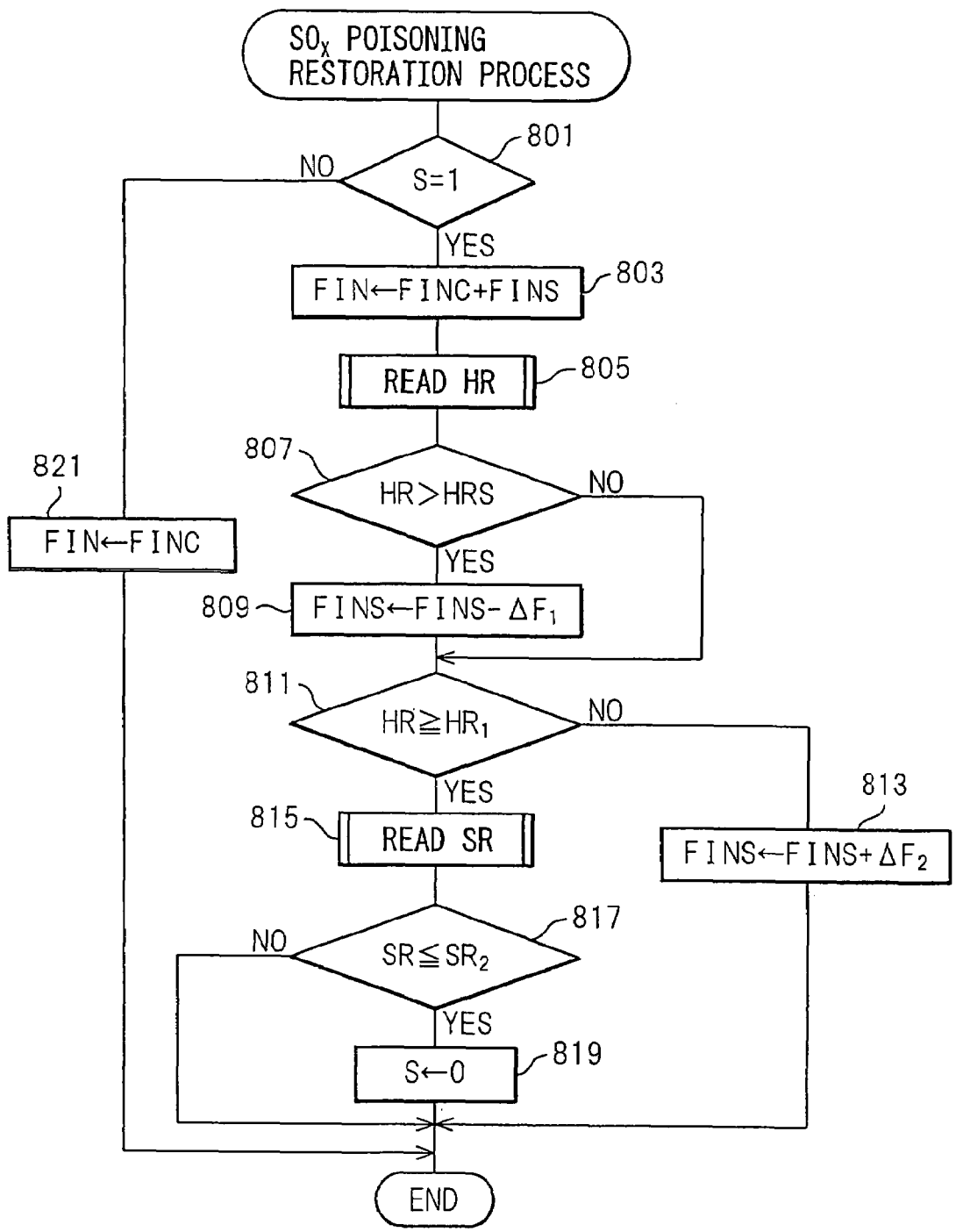
FIG. 8 is a flowchart showing an example of the $SO_X$ poisoning restoration process using the $H_2$ sensor and the $SO_X$ sensor.

FIG. 8 is a flowchart for explaining the $SO_X$ poisoning restoration process according to this embodiment.

This operation, like the operation shown in FIG. 5, is carried out as a routine at predetermined time intervals by the ECU 30.

In the operation shown in FIG. 8, step 801 determines whether the execution of the $SO_X$ poisoning restoration process is required based on the value of the flag S and, in the case where the execution of the $SO_X$ poisoning restoration process is not required (S≠1), the normal fuel injection is carried out at step 821. In the case where the execution of the $SO_X$ poisoning restoration process is required (S=1), on the other hand, the fuel injection amount of the engine 1 is increased by FINS at step 803. The operations of steps 801, 803, 821 are identical to those of steps 501, 503, 519, respectively, shown in FIG. 5.

Upon execution of the $SO_X$ poisoning restoration process at step 803, the $H_2$ concentration HR is read from the $H_2$ sensor upstream of the $NO_X$ occlusion and reduction catalyst 7 (step 805), and the increase amount FINS is increased or decreased by a predetermined value $\Delta F_1$ (step 809) and a predetermined value $\Delta F_2$ (step 813) so that the $H_2$ concentration HR is maintained in the range between the critical concentration HRS of $H_2S$ generation and a first predetermined value $HR_1$ (steps 807, 811).

In the case where $HR \geq HR_1$ holds at step 811, the process proceeds to step 815, where the $SO_X$ concentration SR of the exhaust gas downstream of the catalyst is read from the $SO_X$ sensor 90 arranged downstream of the $NO_X$ occlusion and reduction catalyst 7. In the case where the $SO_X$ concentration SR is reduced to not more than a second predetermined value $SR_2$ at step 817, i.e. in the case where it can be determined that the release of $SO_X$ from the $NO_X$ occlusion and reduction catalyst 7 is complete, then the value of the flag S is reset to zero at step 819 thereby to complete the current operating session.

In the next session of execution this operation, therefore, step 821 is executed after step 801, thereby completing the $SO_X$ poisoning restoration process. Also, in the case where $SR > SR_2$ at step 817, the release of $SO_X$ from the $NO_X$ occlusion and reduction catalyst 7 still continues, and therefore the current operating session is ended with the value S held at 1. In the next operating session, therefore, the $SO_X$ poisoning restoration process of step 803 and subsequent steps is executed.

The predetermined value $HR_1$ at step 811 can be set at an appropriate value in the range between 0.1% (corresponding to stoichiometric air-fuel ratio) and 2.0% (critical value of $H_2S$ generation). However, the smaller the value set, the longer the duration of the $SO_X$ poisoning restoration process, while the larger the set value, the nearer the critical value of $H_2S$ generation. This value, therefore, is desirably determined by an experiment actually conducted using a catalyst.

The judgment value $SR_2$ at step 817, on the other hand, corresponds to the amount of the released $SO_X$ while the $SO_X$ amount remaining in the $NO_X$ occlusion and reduction catalyst decreases to a level free of any practical problem. The value $SR_2$ is also desirably determined by an experiment.

The configuration of FIG. 7 was explained above with reference to a case in which the $SO_X$ trap is not arranged. Also in the case where the $SO_X$ trap is arranged as shown in FIG. 6, however, the $SO_X$ poisoning restoration process like in FIG. 8 is of course possible by providing a $SO_X$ sensor in the exhaust path downstream of the $NO_X$ occlusion and reduction catalyst 7.

LIST OF REFERENCES

1 Engine proper
2 Exhaust path
5a, 5b Start catalyst
7 $NO_X$ occlusion reduction catalyst
30 ECU (electronic control unit)
31 $H_2$ sensor
73 $SO_X$ trap
90 $SO_X$ sensor

The invention claimed is:

1. An exhaust gas purification apparatus for an internal combustion engine, comprising:

a $NO_X$ occlusion and reduction catalyst arranged in the exhaust path of the internal combustion engine for occluding by absorbing and/or adsorbing $NO_X$ in the exhaust gas when the air-fuel ratio of the exhaust gas flowing into the catalyst is lean, and purifying by reducing the occluded $NO_X$ when the air-fuel ratio of the exhaust gas flowing into the catalyst is a stoichiometric air-fuel ratio or a rich air-fuel ratio; and a $H_2$ sensor arranged in the exhaust path upstream of the $NO_X$ occlusion and reduction catalyst for detecting the concentration of the hydrogen component in the exhaust gas;

wherein the $SO_X$ poisoning restoration process in which the temperature of the exhaust gas is increased while the air-fuel ratio of the exhaust gas flowing into the $NO_X$ occlusion and reduction catalyst is held at a rich air-fuel ratio in order to release the sulfur oxide occluded together with $NO_X$ by the $NO_X$ occlusion and reduction catalyst from the $NO_X$ occlusion and reduction catalyst, wherein, based on the hydrogen component concentration in the exhaust gas upstream of the $NO_X$ reduction catalyst detected by the $H_2$ sensor, at least one of the air-fuel ratio of the exhaust gas flowing into the $NO_X$ occlusion and reduction catalyst during the $SO_X$ poisoning restoration process and the duration of the $SO_X$ poisoning restoration process is controlled;

wherein the air-fuel ratio of the exhaust gas flowing into the $NO_X$ occlusion and reduction catalyst is controlled during the execution of the $SO_X$ poisoning restoration process in such a manner that the concentration of the hydrogen component in the exhaust gas detected by the $H_2$ sensor is between 0.1% and 2.0%.

2. An exhaust gas purification apparatus for the internal combustion engine according to claim 1, further comprising a $SO_X$ trap arranged in the exhaust path upstream of the $NO_X$ occlusion and reduction catalyst and downstream of the $H_2$ sensor for occluding $SO_X$ in the exhaust gas in the case where the air-fuel ratio of the exhaust gas flowing into the $SO_X$ trap is a lean air-fuel ratio and releasing the occluded $SO_X$ in the case where the air-fuel ratio of the exhaust gas flowing into the $SO_X$ trap is a stoichiometric air-fuel ratio or a rich air-fuel ratio.

3. An exhaust gas purification apparatus for the internal combustion engine according to claim 2, wherein the air-fuel ratio of the exhaust gas flowing into the $NO_X$ occlusion and reduction catalyst is controlled during the execution of the $SO_X$ poisoning restoration process in such a manner that the concentration of the hydrogen component in the exhaust gas detected by the $H_2$ sensor is lower than the concentration of the hydrogen component at which hydrogen sulfide is generated by the $NO_X$ occlusion and reduction catalyst.

4. An exhaust gas purification apparatus for the internal combustion engine according to claim 2, wherein the exhaust air-fuel ratio is controlled during the execution of the $SO_X$ poisoning restoration process in such a manner that the concentration of the hydrogen component in the exhaust gas flowing into the $NO_X$ occlusion and reduction catalyst is high at the time of starting the $SO_X$ poisoning restoration process and gradually decreases subsequently.

5. An exhaust gas purification apparatus for the internal combustion engine according to claim 2, further comprising a $SO_x$ sensor arranged in the exhaust path downstream of the $NO_x$ occlusion and reduction catalyst for detecting the concentration of the sulfur oxide in the exhaust gas, wherein based on the concentration of the hydrogen component detected by the $H_2$ sensor and the $SO_x$ concentration detected by the $SO_x$ sensor, at least one of the air-fuel ratio of the exhaust gas flowing into the $NO_x$ occlusion and reduction catalyst during the execution of the $SO_x$ poisoning restoration process and the duration of the $SO_x$ poisoning restoration process is controlled.

6. An exhaust gas purification apparatus for the internal combustion engine according to claim 5, wherein the $SO_x$ poisoning restoration process is terminated in the case where the concentration of the hydrogen component detected by the $H_2$ sensor is higher than or equal to a predetermined first value and the concentration of the sulfur oxide detected by the $SO_x$ sensor is lower than or equal to a predetermined second value.

7. An exhaust gas purification apparatus for the internal combustion engine according to claim 1, wherein the air-fuel ratio of the exhaust gas flowing into the $NO_x$ occlusion and reduction catalyst is controlled during the execution of the $SO_x$ poisoning restoration process in such a manner that the concentration of the hydrogen component in the exhaust gas detected by the $H_2$ sensor is lower than the concentration of the hydrogen component at which hydrogen sulfide is generated by the $NO_x$ occlusion and reduction catalyst.

8. An exhaust gas purification apparatus for the internal combustion engine according to claim 1, wherein the exhaust air-fuel ratio is controlled during the execution of the $SO_x$ poisoning restoration process in such a manner that the concentration of the hydrogen component in the exhaust gas flowing into the $NO_x$ occlusion and reduction catalyst is high at the time of starting the $SO_x$ poisoning restoration process and gradually decreases subsequently.

9. An exhaust gas purification apparatus for the internal combustion engine according to claim 1, further comprising a $SO_x$ sensor arranged in the exhaust path downstream of the $NO_x$ occlusion and reduction catalyst for detecting the concentration of the sulfur oxide in the exhaust gas, wherein based on the concentration of the hydrogen component detected by the $H_2$ sensor and the $SO_x$ concentration detected by the $SO_x$ sensor, at least one of the air-fuel ratio of the exhaust gas flowing into the $NO_x$ occlusion and reduction catalyst during the execution of the $SO_x$ poisoning restoration process and the duration of the $SO_x$ poisoning restoration process is controlled.

10. An exhaust gas purification apparatus for the internal combustion engine according to claim 9, wherein the $SO_x$ poisoning restoration process is terminated in the case where the concentration of the hydrogen component detected by the $H_2$ sensor is higher than or equal to a predetermined first value and the concentration of the sulfur oxide detected by the $SO_x$ sensor is lower than or equal to a predetermined second value.

* * * * *